U. BUTCHER.
SINGLE WHEEL EMERGENCY TRUCK.
APPLICATION FILED SEPT. 18, 1914.
1,154,287.
Patented Sept. 21, 1915.
2 SHEETS—SHEET 1.
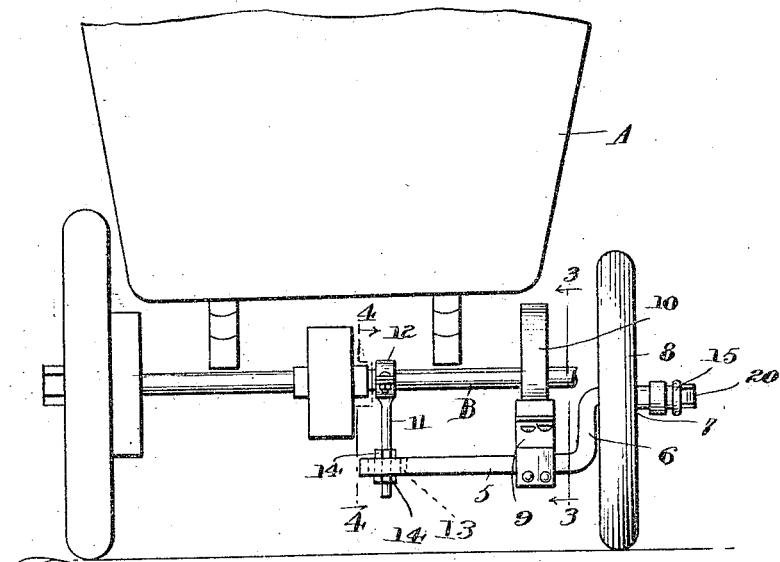
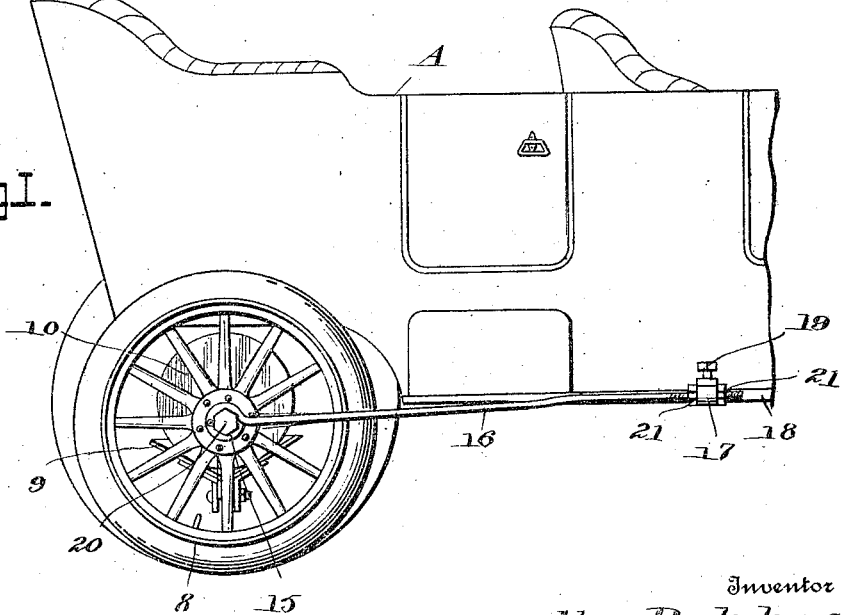
Witnesses
Frederick W. Ely
Geo. Ackman Jr.
Inventor
Ura Butcher,
By Victor J. Evans
Attorney U. BUTCHER.
SINGLE WHEEL EMERGENCY TRUCK.
APPLICATION FILED SEPT. 18, 1914.
1,154,287.
Patented Sept. 21, 1915.
2 SHEETS—SHEET 2.
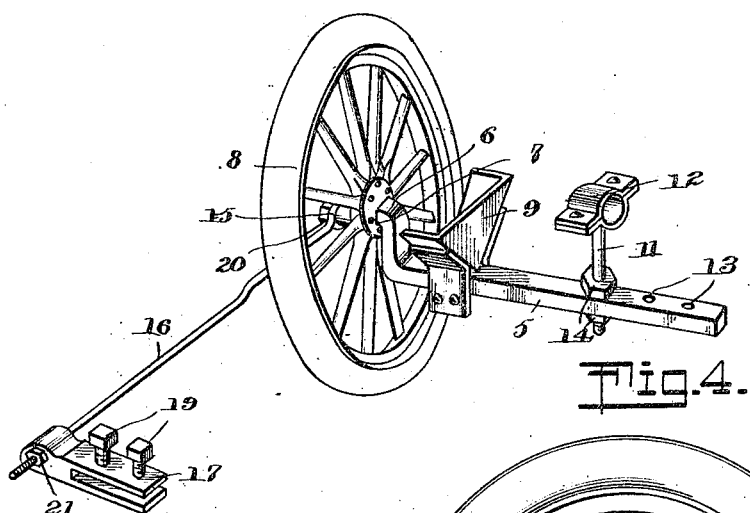
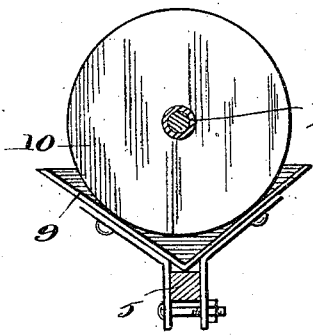
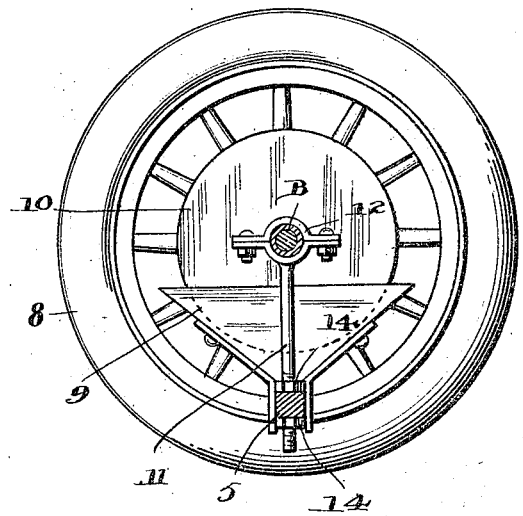
Inventor
Ura Butcher,
Witnesses
Frederick W. Ely
Geo. Ackman Jr.
By Victor J. Evans
Attorney

UNITED STATES PATENT OFFICE.

URA BUTCHER, OF ATHENS, OHIO.

SINGLE-WHEEL EMERGENCY-TRUCK.

1,154,287.  Specification of Letters Patent.  Patented Sept. 21, 1915.

Application filed September 18, 1914. Serial No. 862,280.

*To all whom it may concern:*

Be it known that I, URA BUTCHER, a citizen of the United States, residing at Athens, in the county of Athens and State of Ohio, have invented new and useful Improvements in Single-Wheel Emergency-Trucks, of which the following is a specification.

The invention relates to trucks and more especially to the class of single wheel emergency trucks for automobiles or the like.

The primary object of the invention is the provision of a truck of this character wherein on the breaking of one of the wheels or axles of an automobile, the said truck can be applied to the car for the convenient hauling of the same to a repair shop or garage.

Another object of the invention is the provision of a truck of this character which will fit any automobile, on either the front or rear axle thereof, and will enable the travel of the car from one point to another without undue strain thereon or damage thereto.

A further object of the invention is the provision of a truck of this character which is simple in construction, strong, durable, readily and easily mounted on and detached from a car, reliable and efficient in its purpose and also inexpensive in manufacture.

With these and other objects in view, the invention consists in the construction, combination and arrangement of parts as will be hereinafter fully described, illustrated in the accompanying drawing, and pointed out in the claim hereunto appended.

In the drawing: Figure 1 is a side elevation of an automobile, showing the truck constructed in accordance with the invention applied; Fig. 2 is a rear elevation of the automobile with the truck; Fig. 3 is a sectional view on the line 3—3 of Fig. 2; Fig. 4 is a sectional view on the line 4—4 of Fig. 2; and Fig. 5 is a perspective view of the single wheel truck detached.

Similar reference characters indicate corresponding parts throughout the several views of the drawing.

Referring to the drawing in detail, A designates generally an automobile, which in this instance is of the touring car type although it may be of any other type having a rear axle B, which for the sake of illustrating the manner of application of the single wheel emergency truck hereinafter fully described carries the same although it is to be understood that the said truck is adapted for mounting upon the front axle of the automobile should the occasion require when either axle or the wheels thereon become broken.

The single wheel emergency truck comprises a short axle beam 5 formed at one end with an upturned portion 6 carrying a wheel spindle 7, which is integral therewith, and on which is journaled an auxiliary emergency wheel 8 which is of any ordinary well known construction provided with a metal cushion or pneumatic tire as may be preferred. Clamped upon the beam 5 close to the upturned portion 6 thereof is a trough-like bearing 9, in which is adapted to be seated the brake band 10 disposed concentrically about the rear axle B of the automobile and of the usual construction, while adjustably connected to the said beam 5 is a hanger 11 formed with an axle clip 12, the latter being adapted to embrace the rear axle B of the automobile. The hanger 11 is adjustably connected to the beam 5 by having its shank engaged in any one of a series of holes 13 formed in the said beam and threaded on the shank are jam nuts 14, which engage opposite sides of the beam when the shank is passed through any one of the said holes in the beam and in this manner the hanger is adjustably fastened thereto.

The axle spindle 7 is extended beyond the outer end of the hub of the auxiliary emergency wheel 8 to receive the eye-terminal 15 of a brace rod 16 which has adjustably connected to its opposite end a U-shaped clip 17 to engage with the running board 18 of the automobile, one branch of the clip 17 being fitted with adjustable binding or set screws 19 which serve to firmly fasten the clip 17 on the running board. The eye-terminal 15 of the brace rod 16 is held upon the axle spindle through the medium of suitable lock nuts 20, while the clip 17 is mounted upon the rod 16 and held in adjusted position thereon through the medium of jam nuts 21, which are adjustably threaded on the said rod.

It is of course to be understood that the single wheel emergency truck is used only when any one of the wheels or the axle of an automobile breaks and when applied as hereinbefore set forth will permit the travel of the automobile from one point to another for the hauling thereof to a repair shop or garage thereby obviating the dragging of the disabled car which results in stress upon its parts and oftentimes damage thereto.

From the foregoing it is thought that the construction and manner of operation of the device will be clearly understood, and therefore a more extended explanation has been omitted.

What is claimed is:—

A single wheel emergency truck for automobiles comprising an axle beam having an offset wheel spindle, a wheel journaled on the spindle, a bearing on the beam, an adjustable axle clip connected with the beam and a brace rod connected with the outer end of the spindle and having a clamp.

In testimony whereof I affix my signature in presence of two witnesses.

URA BUTCHER.

Witnesses:
CHAS. E. CAMERON,
OLIVE CAMERON.